United States Patent [19]
Kristensen

[11] Patent Number: 4,895,069
[45] Date of Patent: Jan. 23, 1990

[54] APPARATUS FOR SHELLING BOILED EGGS

[75] Inventor: Jens Kristian S. Kristensen, Odense, Denmark

[73] Assignee: Sanovo Engineering A/S, Odense, Denmark

[21] Appl. No.: 293,367

[22] Filed: Jan. 4, 1989

[30] Foreign Application Priority Data

Jan. 20, 1988 [DK] Denmark ............................ 237/88

[51] Int. Cl.⁴ .............................................. A23J 1/00
[52] U.S. Cl. ....................................... 99/574; 99/580; 99/582
[58] Field of Search ........................ 99/568, 574–576, 99/581, 580, 582, 569, 571; 426/482, 483

[56] References Cited

U.S. PATENT DOCUMENTS

| 3,101,146 | 8/1963 | Willsey ................................ 99/568 |
| 3,216,828 | 11/1965 | Koonz et al. . |
| 3,603,243 | 9/1971 | Foster . |
| 3,859,907 | 1/1975 | Hatcher . |
| 3,877,362 | 4/1975 | Epstein et al. . |
| 4,117,774 | 10/1978 | Wilburn et al. . |
| 4,308,290 | 12/1981 | Fujii . |
| 4,344,359 | 8/1982 | Frechou et al. . |
| 4,614,033 | 9/1986 | Morris ................................ 99/574 |
| 4,773,323 | 9/1988 | Frasch et al. ....................... 99/574 |
| 4,793,248 | 12/1988 | Frederiksen et al. ................. 99/575 |

FOREIGN PATENT DOCUMENTS 0024715 1/1984 European Pat. Off. .
2118433 11/1983 United Kingdom .

OTHER PUBLICATIONS

"Webster's New World Dictionary", 2nd College Ed., 1978, p. 329.

Primary Examiner—Timothy F. Simone
Attorney, Agent, or Firm—Wegner & Bretschneider

[57] ABSTRACT

An apparatus for shelling boiled eggs is adapted to crackle the egg shell in a first section by impact action for a certain period and to subsequently transfer the egg to a second section, in which the egg shell fragments are cleared from the egg body. The first section includes a tubular egg positioning member with an upper opening and a lower opening which during the crackle action are positioned above two shafts rotatable in the same direction of rotation. The second section comprises a conveyor belt and a retainer roller mounted in spaced relationship from a cylinder, the roller and the cylinder being rotatable about substantially parallel axes of rotation and being capable of contacting the upper side of the conveyor belt. The apparatus is capable of shelling the eggs without causing damage thereto, even though the eggs are only light-cooked, i.e. so-called "smiling" eggs.

5 Claims, 2 Drawing Sheets

APPARATUS FOR SHELLING BOILED EGGS

BACKGROUND OF THE INVENTION

The invention relates to an apparatus for shelling boiled eggs and adapted in a first section to crackle the egg shell by impact action for a certain period and to subsequently transfer the egg to a second section in which the egg shell is cleared from the egg body.

From e.g. U.S. Pat. No. 3,603,243 there is known an apparatus of this type, wherein the shelling is effected by cooling a portion of the boiled eggs just inside the shell, following which the eggs are conveyed to the first section comprising a box divided by a spiral passage and provided with inwardly projecting edges. The box revolves and in unison with the egg rolling through the spiral passage the shell crackles by impacts against the projecting edges. The egg is directed from the box to a roller conveyor constituting the second section of the apparatus, in which the egg shells are washed off the boiled egg by water jets.

Said prior apparatus is very complicated and in view of the fact that the spiral passage has a determined length, there is no possibility of adapting the crackle time to the size, age or shell thickness of the eggs, thereby causing a larger or smaller part of the eggs not to be peeled and/or to be damaged during fracturing by scratches or cuts in the albumen or white so that they must be discarded after shelling. In practice, it has turned out that the number of damaged eggs may be reduced by prolonging the boiling time which, however, has the undesired result that the transitional area between yolk and albumen takes a green tint.

SUMMARY OF THE INVENTION

The object of the present invention is to provide an apparatus of a simple structural design for peeling shells from boiled eggs that is capable of shelling the eggs without causing damage thereto, even though the eggs are only light-cooked, i.e. so-called "smiling eggs".

In this respect an apparatus of the kind initially referred to is characterized in that the first section comprises a tubular egg positioning member with an upper opening and a lower opening which during the crackle action is positioned above two shafts rotatable in the same direction of rotation, and that the second section comprises a conveyor belt and a retainer roller mounted in spaced relationship from a cylinder, the roller and the cylinder being rotatable about substantially parallel axes of rotation and being capable of contacting the upper side of the conveyor belt.

The egg positioning member passes during fracturing the egg to a position above, and into contact with at least one of the two shafts which upon their being rotated in the same direction of rotation, urge the egg to rotate concurrently with cracking the egg shell by impact against the walls of the positioning member.

After completed crackle action the conveyor belt advances the egg between the retainer roller and the cylinder which by contact with the belt are compulsorily rotated in one direction of rotation. The roller and the cylinder will turn the egg in the opposite direction of rotation so that the egg at its contacting face with the belt is moved oppositely the travelling direction thereof, thereby causing the shell to loosen from the egg and to advance under the roller which then completely removes the shell.

In order to ensure a uniform fracturing of the whole egg shell the apparatus is advantageously designed in such a manner that the egg positioning member at the upper opening, on one hand, is provided with an eccentrically disposed egg receiving support and a rod extending across the opening at the one side thereof and, on the other hand, is formed as a square tube with such a conical shape that the egg in the vicinity of the lower opening is prevented from effecting a pure rotation about its longitudinal symmetrical axis and that at least one of the shafts is provided with longitudinal edges that are also capable of impacting against the egg shell.

The strength of the egg shell and its ability of clinging to the boiled albumen depend on the age and size of the eggs and obviously also on the thickness of the shell, and it is therefore advantageous that the time of fracturing and/or the rotational speed of the edged shafts may be adjusted to the eggs to be shelled.

BRIEF DESCRIPTION OF THE DRAWINGS

An embodiment of the invention is explained in detail with reference to the very schematical drawings which only illustrate the details necessary to understand the invention, and in which.

DESCRIPTION OF PREFERRED EMBODIMENTS

In the following description for the sake of clarity there are mentioned only such elements that are necessary to understand the invention. Bearings for axles, a supporting structure for the apparatus, means for rotating rods and displacing movable arms, a drive for a conveyor belt and connections for a control unit etc. are elements well known in the art and shall not be described in detail.

Figure 1:
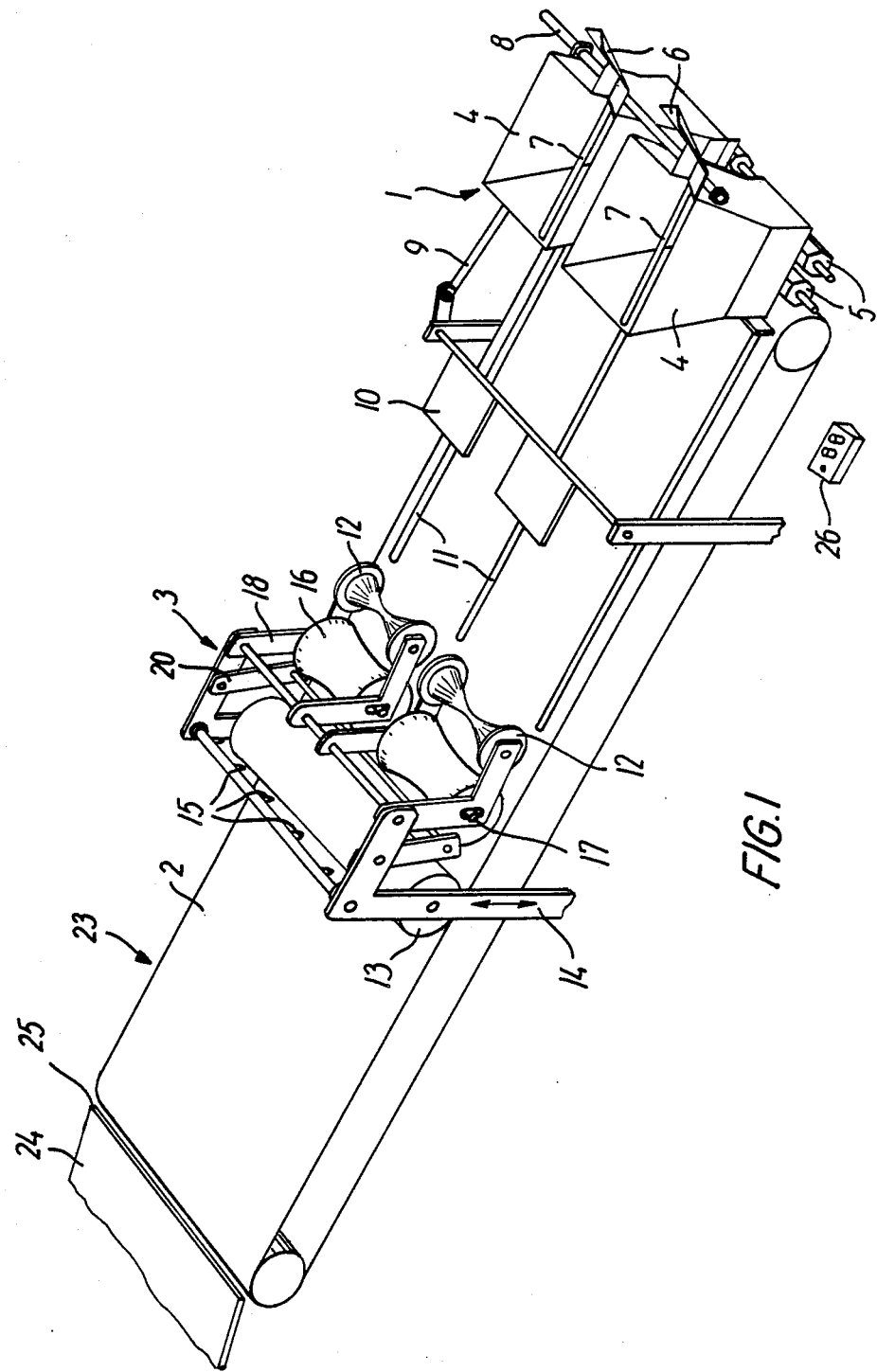
FIG. 1 is a perspective view of an apparatus according to the invention.

An apparatus for shelling boiled eggs includes a first section 1 in which the egg shell may be cracked and a longitudinally movable conveyor belt 2 passing the cracked eggs to a second section 3 adapted to peel the crackled shell off the boiled egg, the apparatus having a number of parallel egg processing paths adapted in dependence of the intended capacity; FIG. 1 illustrates two parallel paths.

The first section 1 accommodates beneath egg positioning members 4 two pivotal shafts 5 which in the area beneath members 4 have a hexagonal cross-section. By means of a common pinion, not shown, the shafts may be rotated in the same direction of rotation. The positioning member 4 is formed as a square tube that is vertical in the illustrated position and having such a conical shape that the internal width at the lower portion of the tube is a little smaller than the length of the eggs to be processed. At the rearwardly directed upper edge of member 4 there is provided a rearwardly projecting and eccentrically positioned bowl 6 or support for receiving eggs, and a longitudinal rod 7 is extending therefrom across the upper opening of member 4.

Member 4 is secured to a suspension 8 in the form of a rod pivotal between two extreme positions, implying that the lower opening of member 4 is either positioned above shafts 5 or above the rearmost part of conveyor belt 2. One of members 4 is over an articulate mechanism 9 connected with pivotally journalled egg barring flaps 10 in such a manner that said flaps prevent eggs from passing when the lower opening is in the position above the conveyor belt. Between the first and the second sections 1, 3 the egg processing paths are laterally separated by side guides 11.

In the second section 3 hourglass-shaped guides 12 ensure that the eggs are positioned with transverse longitudinal axis prior to the shelling step. A circular-cylindrical cylinder 13 is transverse to conveyor belt 2 and is pivotally journalled in vertically movable arms 14 supporting nozzles 15 for wash water above the roller. At a distance from the cylinder retainer rollers 16 are floatingly journalled in recesses 17 provided in pivot arms 18 suspended from arms 14. When arms 14 are moved upwards, a rest 20 is adapted to be turned upwards, thereby actuating pivot arms 18 and thus also retainer rollers 16 to move away from the cylinder.

Figures 2, 3:
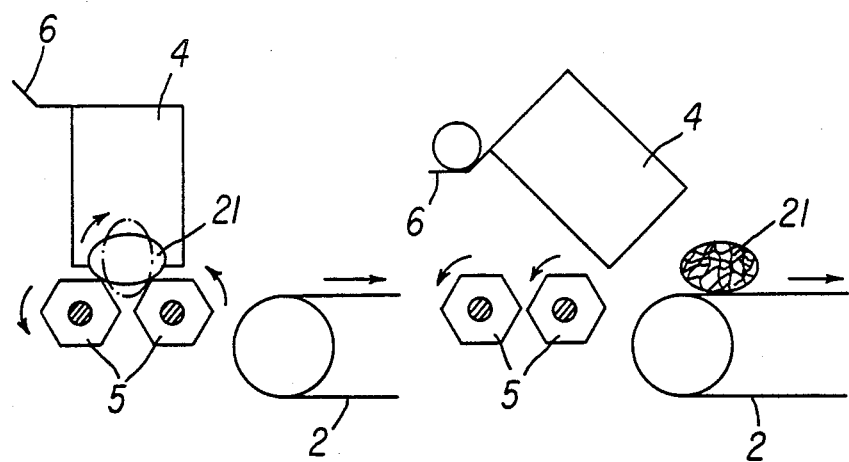
FIGS. 2 and 3 illustrate cross-sections through a first section of the apparatus in FIG. 1.

The mode of operation of the apparatus according to the invention will now be described with reference to FIGS. 2, 3 and 4.

By means of an egg supply device, not shown, an egg 21 is placed in bowl 6 while the lower opening of member 4 is in the position above conveyor belt 2. Rod 8 is pivoted to the second extreme position and the egg falls down into member 4, but due to the eccentric positioning of bowl 6 the egg is compulsorily turned over by rod 7 so as to be oriented with practically vertical longitudinal axis when striking against shafts 5.

Shafts 5 are rotated in the same direction of rotation and urge the egg to rotate in unison with the fracturing of the shell as previously described. After a pre-determined time, rod 8 is activated to pivot member 4 so that another egg is received in bowl 6 and the crackled egg is discharged on belt 2 passing the egg 21 to abut against barring flap 10 which is lifted when rod 8 is again activated.

The egg is advanced to guide 12 to be positioned and when the next egg is completely crackled, suspension 8 as well as arms 14 that raise roller 16, cylinders 13 and guide 12 are activated. When the egg by the belt has passed by roller 16, arms 14 are lowered until the cylinder and the roller abut on belt 2 with the egg positioned therebetween. In this position, pivot arms 18 are pivoted a small angle relative to vertical and opposite the travelling direction of the belt, and this together with the floatingly journalling in recesses 17 make retainer roller 16 to exert such a light pressure against the egg that it abuts both roller 16 and cylinder 13 in unison with the egg being pressed downwards against belt 2 with an appropriate pressure.

Figure 4:
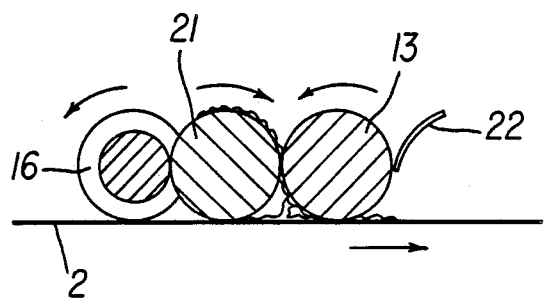
FIG. 4 is a cross-section through a second section of the apparatus in FIG. 1.

As illustrated in FIG. 4, belt 2 will by friction action urge cylinder 13 and roller 16 to rotate in the same direction, whereas they in turn exert such a friction action on the egg that it is compelled to rotate in the opposite direction in spite of the fact that in so doing its surface contacting the belt is moving opposite the travelling direction of belt 2.

Because the egg shell is fractured and thus to a certain extent is flexible, belt 2 moving oppositely the adjacent egg surface will loosen the shell from the egg and clear it from the white, thereby forming a "pocketlike" heap of shell segments which are at least partially kept together by the shell membrane. The shell segments will be pushed beneath cylinder 13 subsequently pulling the remaining shell off the egg. A scraper member 22 or a water jet generated by nozzles may clear the cylinder from shell fragments that are removed by belt 2.

When arms 14 are raised, the belt passes the shelled egg by a third section 23 for control and possible final cleaning, following which the egg may be discharged, for instance on a table 24, while the shells are dumped through a slot 25 between the table and the belt.

Water is supplied through nozzles 15 during the shelling step and corresponding nozzles may likewise be provided above members 4.

Arms 14 and suspension 8 are activated by a control unit 26—only indicated on the drawing—which further allows adjustment of the cycling period and/or the rotational speed of shafts 5.

In order to facilitate the shelling the belt may be provided with ribs. Rollers 16 may be circular-cylindrical and cylinder 13 may pathwise have the shape of an hourglass.

One of shafts 5 or both of them may have a cylindrical cross-section and a rubber covering.

I claim:

1. An apparatus for shelling boiled eggs to separate egg shell from an egg body comprising a first section means for crackling an egg shell by impact action for a certain period, a second section means for clearing egg shell fragments from the egg body, and means for transferring the egg from the first section means to the second section means, wherein the first section means includes two shafts rotatable in the same direction of rotation, and a tubular egg positioning member with an upper opening and a lower opening, the lower opening being positioned above the two shafts during crackling, and the second section means includes a conveyor belt with an upper side, a cylinder and a retainer roller mounted in spaced relationship from the cylinder, the roller and the cylinder being rotatable about substantially parallel axis of rotation and being capable of contacting the upper side of the conveyor belt.

2. An apparatus as claimed in claim 1, further comprising an egg receiving support disposed eccentrically at the upper opening of the egg positioning member, a rod extending across the upper opening at one side thereof, the egg positioning member being formed as a square tube with such a conical shape that the egg in the vicinity of the lower opening is prevented from effecting a pure rotation about its longitudinal symmetrical axis, and at least one of the shafts having longitudinal edges.

3. An apparatus as claimed in claim 1, wherein the apparatus includes pivot arms, and recesses provided in the pivot arms, the cylinder in circular-cylindrical, and the retainer roller is substantially shaped as an hourglass and provided with a shaft floatingly journalled in the recesses, said pivot arms being pivoted a small angle relative to vertical and opposite the travelling direction of the belt when the roller abuts on the belt.

4. An apparatus as claimed in claim 2, wherein an actuating rod is secured to the egg positioning member at the upper opening thereof, said rod being pivotal about its longitudinal axis so as to pivot the lower opening of the egg positioning member to a position above the conveyor belt, the cylinder and the roller are adapted to be raised from the conveyor belt while simultaneously moving away from each other, and a control unit activates the rotation of the actuating rod and the vertical movement of the cylinder and the roller, said control unit allowing the time of fracturing, or the speed of rotation, or the time of fracturing and the speed of rotation of the shafts having longitudinal edges to be adjusted.

5. An apparatus as claimed in claim 3, wherein an actuating rod is secured to the egg positioning member at the upper opening thereof, said rod being pivotal about its longitudinal axis so as to pivot the lower opening of the egg positioning member to a position above the conveyor belt, the cylinder and the roller are adapted to be raised from the conveyor belt while simultaneously moving away from each other, and a control unit activates the rotation of the actuating rod and the vertical movement of the cylinder and the roller, said control unit allowing the time of fracturing, or the speed of rotation, or the time of fracturing and the speed of rotation of the shafts having longitudinal edges to be adjusted.

* * * * *